United States Patent [19]
Disborg

[11] Patent Number: 5,855,446
[45] Date of Patent: Jan. 5, 1999

[54] HYDRAULIC CLAMP BUSHING HAVING SIGMA SHAPED BUSHING ENDS

[75] Inventor: Lennart Disborg, Linköping, Sweden

[73] Assignee: ETP Transmission AB, Linkoping, Sweden

[21] Appl. No.: 875,575

[22] PCT Filed: Jan. 25, 1996

[86] PCT No.: PCT/SE96/00076

§ 371 Date: Jul. 24, 1997

§ 102(e) Date: Jul. 24, 1997

[87] PCT Pub. No.: WO96/23982

PCT Pub. Date: Aug. 8, 1996

[30] Foreign Application Priority Data

Feb. 1, 1995 [SE] Sweden .................................. 9500358

[51] Int. Cl.$^6$ ...................................................... F16B 2/02
[52] U.S. Cl. ................................ 403/31; 403/373; 403/5; 279/4.03
[58] Field of Search ..................... 403/31, 15, 5, 403/34, 373, 24; 279/2.08, 2.06, 4.03, 4.01; 192/88 B

[56] References Cited

U.S. PATENT DOCUMENTS

| | | |
|---|---|---|
| 3,486,776 | 12/1969 | Baron . |
| 3,507,507 | 4/1970 | Tobler et al. . |
| 3,626,506 | 12/1971 | Spieth . |
| 3,663,027 | 5/1972 | Klipping . |
| 4,264,229 | 4/1981 | Falk et al. ............................. 403/31 X |
| 4,531,856 | 7/1985 | Gebelius . |
| 4,940,354 | 7/1990 | Holderegger et al. ...................... 403/5 |
| 5,079,836 | 1/1992 | Swars ................................... 403/31 X |
| 5,102,253 | 4/1992 | Conti .................................... 403/31 X |

FOREIGN PATENT DOCUMENTS

| | | |
|---|---|---|
| 0394694 | 10/1990 | European Pat. Off. . |
| 2659560 | 7/1978 | Germany ................................... 403/5 |

Primary Examiner—Harry C. Kim
Attorney, Agent, or Firm—Larson & Taylor

[57] ABSTRACT

Hydraulic clamp bushing (13, 14) having a double walled sleeve (7), a hydraulic pressure medium which is trapped in a chamber (5) between the sleeve walls, and a mechanism for pressurizing the pressure medium. One, or both, sleeve walls (7) is/are formed for expanding radially outwards and/or inwards when the pressure medium is pressurized, whereby the clamp bushing is clamped to a shaft, a hub or a similar object, in particular a rotary shaft (17, 18). The pressure medium chamber (5) is formed with angularly inwards or sigma formed bushing ends (9) designed so that the ends are straightened up as a first stage when the clamp bushing is pressurized, whereby the axial ends of the bushing facing the shaft (17, 18) are pressed to the shaft (17,18) thereby providing a straightening up of the bushing (13, 14) on the shaft before the intermediate portions of the sleeve are pressed to the shaft (17, 18).

7 Claims, 3 Drawing Sheets

X = Axial wobbling
B = Width
$\Delta D$ = Play between hub/shaft
$D_1$ = Outer diameter of hub $$X = \frac{\Delta D}{B} \cdot D_1$$

$$X_{kn} = \frac{\Delta D \cdot D_1}{B} \cdot \frac{1}{kn}$$

HYDRAULIC CLAMP BUSHING HAVING SIGMA SHAPED BUSHING ENDS

The present invention generally relates to a hydraulic clamp bushing of the type which comprises a double walled sleeve, a closed pressure chamber between said sleeve walls, a hydraulic pressure medium trapped in said chamber between the sleeve walls and means for pressurizing the pressure medium, and in which one of the sleeve walls, or both walls, is/are formed so as to expand radially outwards and/or inwards when the pressure medium is pressurized, whereby the clamp bushing becomes clamped to a shaft, a hub or another means, in particular against a rotatable shaft. A typical clamp bushing of said type is shown for instance in the U.S. Pat. No. 4,093,052 (inventor Curt G Falk).

Clamp bushings of this type are well suited for connecting a hub to a bushing or a hollow shaft for transmitting axial forces and/or rotary torques, and they can for instance be used for mounting of rotary tools on a machine spindle. In some cases there may appear problems with such conventional clamp bushings for the reason that the sleeve walls expand in a bow form when the hydraulic pressure medium is pressurized, thereby providing an almost point formed line of contact of the wall against the shaft during the initial phase of the pressurization, and this may make the clamp bushing become obliquely mounted on the shaft. Clamp bushings of the said type generally also have a contact surface to engage the shaft and/or the hub which is shorter than the total length of the bushing. For reducing the risque that the clamp bushing is mounted obliquey located on the shaft, and for providing a high torque transmission ability such clamp bushings therefore often are formed with relative great axial length. Long clamp bushings generally give small radial and axial wobbling.

In many cases it is, however, necessary that the(clamp bushing, for technical reasons, be made relatively short, and in such cases there may appear problems with axial and radial wobbling of the tool which is mounted on the shaft. Such problem may for instance appear when tools and other means having a relatively great diameter are mounted on a machine spindle by means of a relatively short clamp bushing, for instance upon mounting of rotary knives, cutting rolls, saw blades, grinding wheels etc. on a machine spindle. Special problems may appear for instance in the type of cutting apparatus, in which a plate formed material is feed in between two overlapping cutting rolls which cut or shear the plate into strips. For obtaining a good cutting result it is important that the overlapping cutting rolls are located very close to each other and that the cutting knives or rolls are subjected to a very minimum of wobbling. Even a very slight axial wobbling results in a bad cutting result and a risque that the cutting rolls collide, what in turn leads to a quick wear of the cutting rolls.

A fixed hub or a fixed ring which is moved on a shaft may, at a maximum, be mounted obliquely as shown with the dotted lines in FIG. 8, which figure is an illustration of the background of the invention. In said figure the following symbols are used:

X=axial wobbling

B=the original width (axial length) of the hub or ring $\Delta D$=the play between the hub and the shaft (generally only a few 100th of a mm)

$D_1$=the outer diameter of the hub (for instance the cutting circle).

If the values of X and $\Delta D$ are relatively small as compared with B and $D_1$ the following geometrical relationship is obtained:

$$X = \Delta D / B \cdot D_1$$

Thus, said geometrical relationship gives a maximum wobbling which is a product of the play $\Delta D$ and the out diameter $D_1$, divided by the width B.

Tests have shown that the following formula is obtained when using a bushing of conventional hydraulic type:

$$X = (\Delta D \cdot D_1 / B) \cdot 1/kn$$

in which kn is a factor between 6 and 15. It is evident that the wobbling is reduced by a factor kn when a hydraulic clamp bushing is used.

The reason for appearance of wobbling when using relatively short clamp bushings of the above mentioned type can be looked for in the fact that the radially expandable sleeve or sleeves expand in bow form when the pressure medium is pressurized (compare right half of figure), and this means that there is an almost point formed line of contact between the sleeve and the shaft or the spindle at the centre of the sleeve during the initial phase of the pressurization, and that the contact surface is extended in both directions from the axial centre during the proceeded pressurization (compare right half of FIG. 3). The bushing sleeve does not, however, get into contact with the shaft over the entire length of the clamp bushing. This is illustrated diagrammatically and in an exaggerated view in the right halves of FIGS. 1b, 2b and 3b, which show a clamp bushing of the above mentioned previously known type During such formation of contact between the clamp bushing sleeve and the shaft it may happen that the sleeve, and thereby the tool, for instance the knife, is mounted slightly obliquely, and this inevitably leads to non desired wobbling. The problem increases the shorter the clamp bushing is and the greater the diameter is of the rotary tool.

According to the invention the said problems are solved in that the clamp bushing is formed with angularly inwards or sigma formed ($\Sigma$-formed) bushing ends. A prerequisite for the desired function is that the material of the body or the hub of the clamp bushing, which carries the tool, is relatively thick, and that the thickness of the material of the expandable sleeve wall and of the sleeve ends is chosen so that the $\Sigma$-shaped ends are actuated first and before the expandable sleeve facing the shaft is subjected to any noticeable change of shape when the hydraulic pressure medium is pressurized. The material thickness of the sleeve ends can be less, but in special cases alternatively thicker, than the material thickness of the body or the hub.

When such a bushing is pressurized the pressure against the angularly inwards or sigma shaped ($\Sigma$) ends provides a sort of lever (hinge) effect which makes the ends of the clamp bushing expand as a first step of mounting. This means that the clamp bushing is straightened up and is stabilized by the ends of the sleeve during the first phase of the pressurization of the pressure medium, whereas the continued pressurization makes the intermediate part or parts of the clamp bushing successively become pressed to the shaft or the spindle thereby creating the necessary possibility of transmitting high torques. A clamp bushing of said type having the above mentioned sigma shaped ends also provides a contact surface against the shaft which corresponds to nearly 100% of the total length of the bushing (compare left half of FIG. 3).

In the enclosed drawings FIGS. 1, 2 and 3 illustrate, diagrammatically and somewhat exaggeratedly, the differences in function between a conventional hydraulic clamp bushing (to the right) of the type shown for instance in the U.S. Pat. No. 4,093,052 and a clamp bushing suggested according to the present invention and having sigma shaped bushing ends (to the left).

Hydraulic clamp bushings having "concave" bushing ends are known in the patent literature, for instance from U.S. Pat. No. 3,663,027. The clamp bushing shown in the patent can not, however, be used as a separate tool holder but it requires supporting and stabilizing side walls for its function both at the ends and at the radial outer side thereof. Also said concave ends do not act with the above mentioned lever or hinge effect like the bushing of the invention. The illustrated clamp bushing is solely intended for interconnecting a hub and a shaft and it can consequently not be used separately, and not as a holder for tools having relatively large diameter. It is also not taught in the patent that the actual clamp bushing can solve the problem with axial and radial wobbling of tools. Similar types of clamp bushings are shown in U.S. Pat. No. 3,507,507.

Now the invention is to be described more in detail with reference to the accompanying drawings. In the drawings FIGS. 1, 2 and 3 show, in an exaggerated scale, the function of a clamp bushing according to the invention having angularly inwards or sigma formed ends (to the left in the figures), and compared therewith the function of a conventional clamp bushing (to the right in the figures). Both types of bushings are formed with a recess which is filled with a pressure medium.

Figure 8:
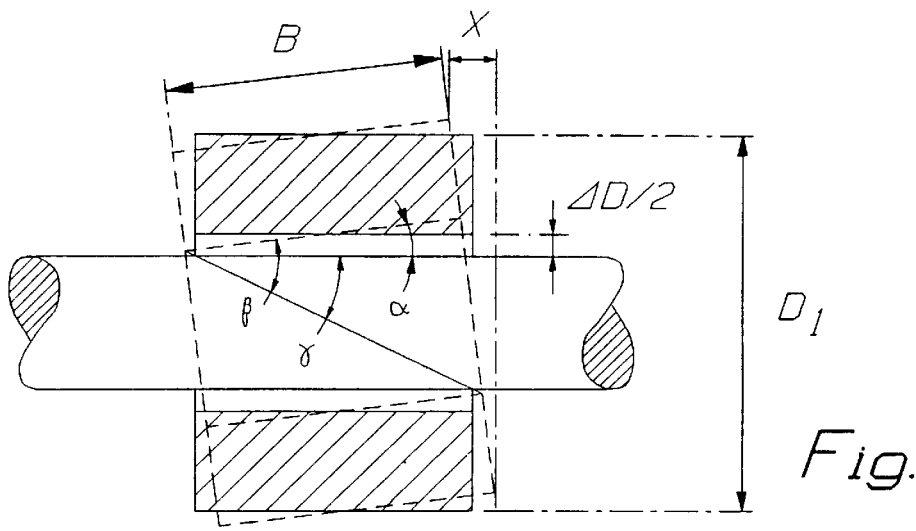

FIG. 8 diagrammatically illustrates the geometry of a hub which is obliquely placed and mounted on a shaft.

Figure 1:
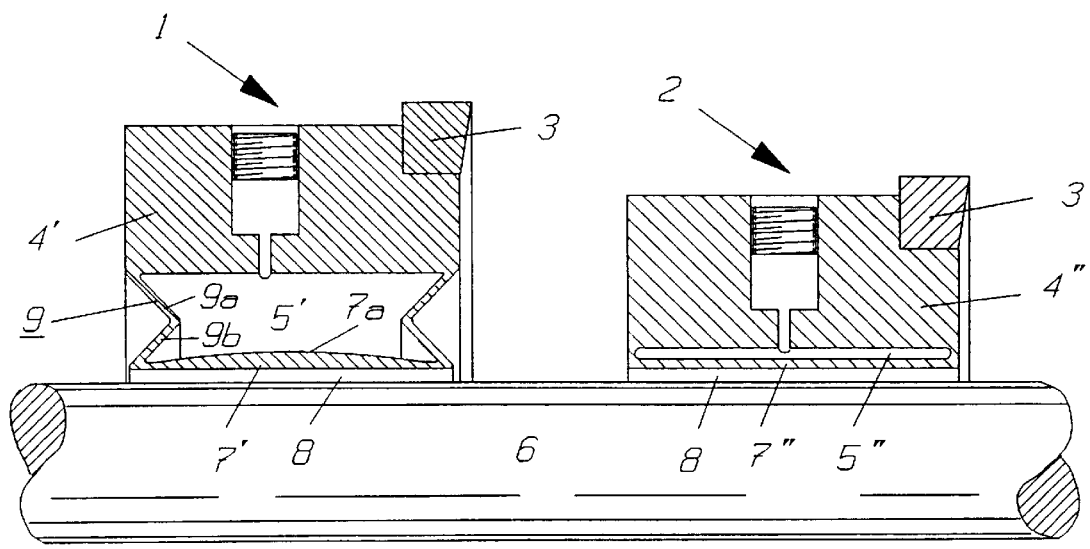
Figure 2:
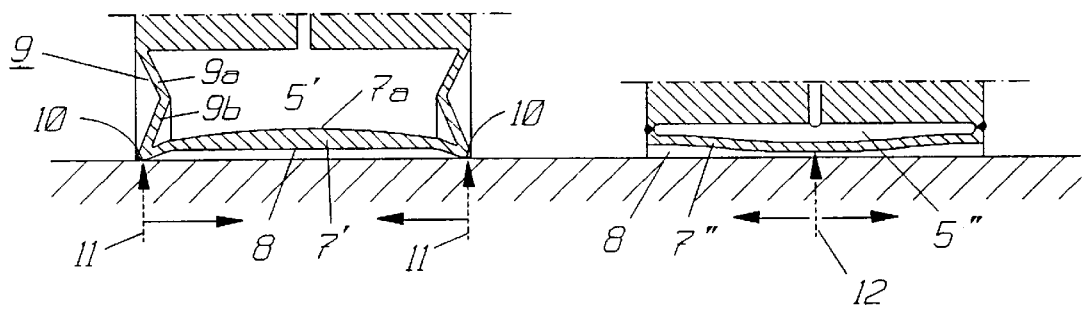
Figure 3:
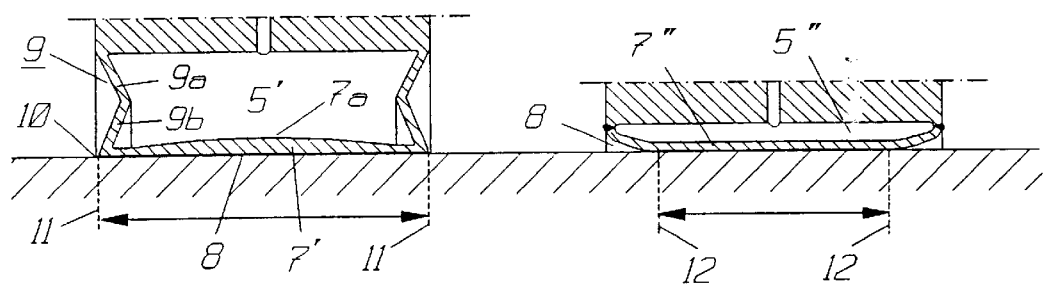

FIGS. 1, 2 and 3 show two different types of clamp bushings, namely, to the left in each figure, the actual new type of clamp bushing 1 according to the invention having sigma shaped ends, and to the right, to be compared therewith, a conventional clamp bushing 2. In both cases it is presupposed that the clamp bushings are intended to be used as holders for a cutting tool or a circular knife 3 which is mounted on the clamp bushing body 4' and 4" in a suitable way. Both types of clamp bushings are formed with a pressure chamber 5' and 5", respectively, having a hydraulic pressure medium trapped therein, which pressure medium can be pressurized by a hydraulic pressure, whereby a cylinder wall 7' and 7", respectively, facing the shaft 6 expands radially inwards and presses the bushing to strongly engage the shaft 6. It is obvious that the inner sleeve 7' of the clamp bushing according to the invention is formed with a successively increasing and thereafter successively decreasing thickness 7a, as seen in the axial direction thereof.

In FIG. 1 the clamp bushings are shown in their non-expanded conditions, and it is obvious (exaggeratedly) that there is a slight gap 8 between the bushing 1 and the shaft 6.

As shown in FIG. 2, left half, the ends 9 of the bushing will, already during the initial pressurization of the pressure medium in the chamber 5', be pressed out from each other, whereby there is created a lever (hinge) effect which makes the inner ends 10 of the bushing become pressed into contact with the shaft 6 before there is any substantial radial expansion of the cylindrical inner sleeve wall 7', or the parts 7a of the sleeve wall 7' which are located more close to the centre thereof. This is a very important feature of the invention since the point like line of contact 11, at both ends of the bushing, against the shaft provides a straightening up of the bushing to its accurately machined value before the bushing is clamp connected to the shaft each time the bushing is pressurized. If the bushing should eventually appear slightly obliquely in its non-expanded condition such fault is automatically corrected, with great force, during the initial phase of the pressurization.

As shown to the right in FIG. 2 a convention clamp bushing presents exactly the opposite function, namely that the pressurization primarily provides an almost point formed line of contact 12 against the shaft 6 substantially halfway the bushing. Therefore, the bushing is not straightened up during the pressurization. On the contrary the bushing is generally clamp connected to the shaft in its oblique position.

In FIG. 3 there is illustrated another important feature of the bushing according to the present invention, namely that the bushing of the invention, in its fully pressurized condition, provides a contact surface 11←→11 against the shaft 6 which corresponds to nearly 100% of the length of the bushing. Differing therefrom the contact surface 12←→12 of a conventional clamp bushing (see right half of FIG. 3) corresponds to only 50–80% of the length of the bushing. The percentual length of the contact surface is depending on the total length of the bushing—the shorter bushing, the lower percentual value. Thanks to the above mentioned two features a bushing according to the invention can be made substantially shorter than a conventional bushing with the risque that wobbling appears.

For a good function it is important that the ends 9 of the bushing are formed fold angularly inwards to such extent that the walls provide the desired lever effect and primary make the two bushing ends get into a point formed line of contact against the shaft. The ends preferably are formed so that the end wall parts 9a, 9b extend over a top angle in relation to each other of 70°–110°. A too large angle gives a too small radial moment of the inner ends of the bushing during the pressurization, and a too small top angle may make the intermediate part 7a of the cylindrical inner wall 7' expand radially before the ends of the bushing are moved into contact with the shaft 6.

The above mentioned expression for the axial wobbling of a hydraulic ushing, which is discussed with reference to FIG. 8, and which relates to a conventional hydraulic bushing is $$X=(\Delta D \cdot D_1/B) \cdot 1/kn.$$

In a hydraulic clamp bushing according to the invention having angularly inwards or sigma shaped ends the factor kn≡50, which means that the axial wobbling of clamp bushing according to the invention is 3–10 times less than the axial wobbling (kn=6–15) of a conventional bushing of the above discussed type. The principle also shows that ΔD is not so critical for a bushing of the invention as in previously known bushings, and that it is possible to make use of less expensive shafts and hubs still providing the same high accuracy.

For instance for circular knives, only the accuracy from the machining or grinding of the knife is determining the wobbling, since it has been possible according to the invention to eliminate any oblique mounted of the knives.

Figure 4:
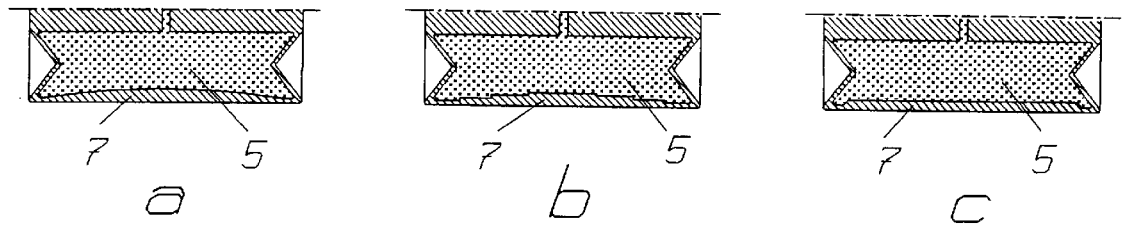
FIGS. 4a, 4b and 4c are cross section views of three alternatively formed clamp bushings according to the invention.

FIGS. 4a, 4b and 4c are similar cross section view of three alternative embodiments of the invention. In FIG. 4a the expandable inner sleeve 7 is formed with a successively increasing and thereafter decreasing thickness of material, as seen in the axial direction of the bushing. In FIG. 4b the expandable inner sleeve wall is formed with stepwise changed wall thickness, and in FIG. 4c the inner sleeve is formed with narrow sleeve portions at and adjacent the ends and with a relatively thicker intermediate wall portion there between. Of course the same type of sleeve wall can be formed both at the inner sleeve and the outer sleeve, as shown for instance in FIGS. 6 and 7.

Figure 5:
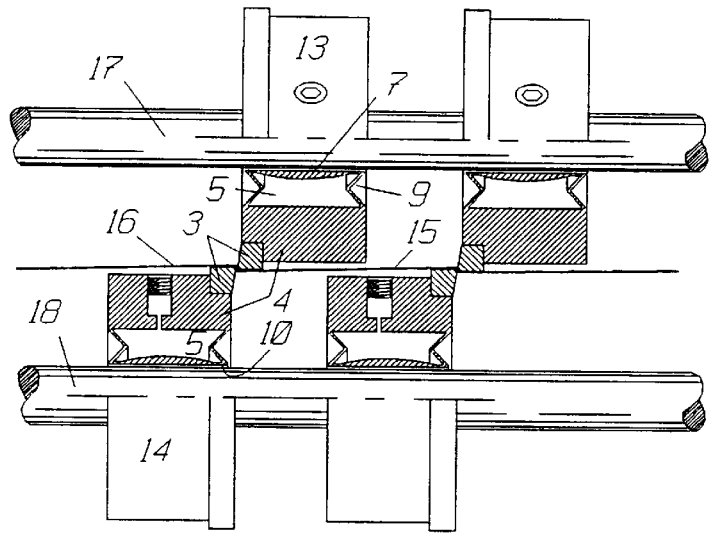
FIG. 5 shows a part of a cutting machine for cutting strips out of a plate formed material.

FIG. 5 shows two pairs of clamp bushings 13, 14 according to the invention used as holders for rotary knives 3 adapted to cut out strips 15 of material from a plate formed material like a metal plate 16. For this purpose one bushing with its knife of each pair of bushings 13, 14 is mounted on a shaft 17 and 18, respectively, and said pairs are adjusted so that the knives slightly overlap each other and with their cutting edges are located in substantially the same transversal plane for providing the best possible cutting result. Thanks to the new type of clamp bushing the knives can be mounted so that there is no wobbling at all, and therefore the knives give neat and sharp cutting surfaces, and so that the knives are not subjected to any noticeable wear.

Figure 6:
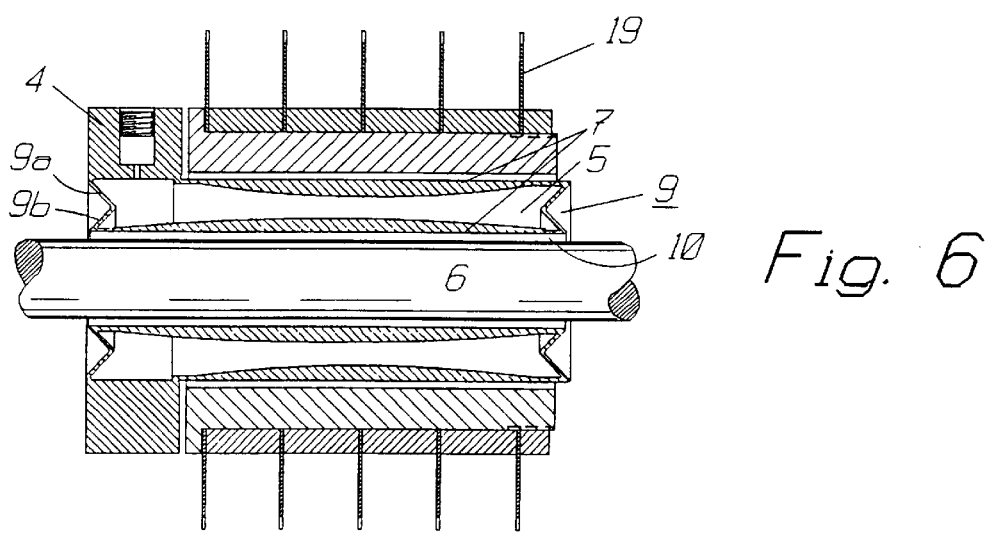
FIG. 6 shows an embodiment of a clamp bushing according to the invention used as a holder for a series of saw blades.

In FIG. 6 is shown an alternative embodiment, in which the clamp bushing according to the invention is used as a holder for a set of saw blades 19 arranged to saw strips out of a plate formed material.

Figure 7:
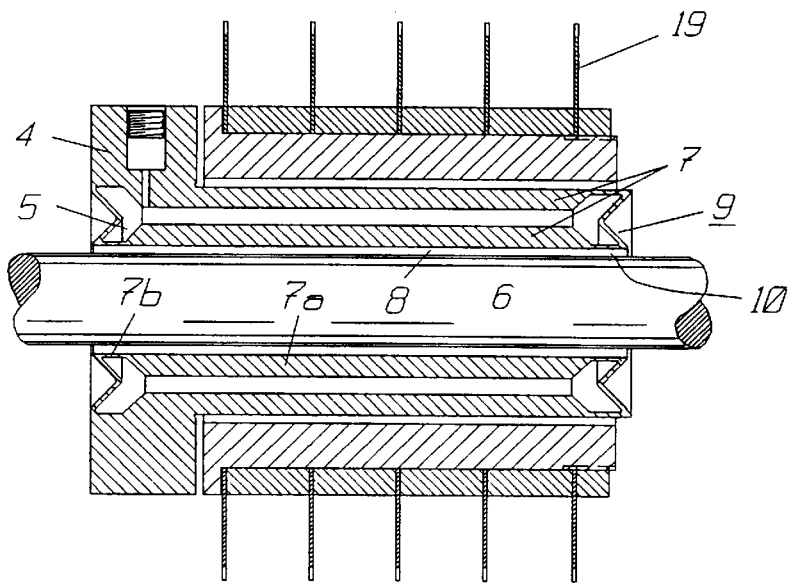
FIG. 7 shows, in the same type of view as that of FIG. 6, an alternative embodiment of a clamp bushing according to the invention.

In FIG. 7 there is shown a further alternative embodiment of the invention, in which the cylinder walls 7 are formed with varying thickness, namely so that the wall parts 7a adjacent the ends bushing 9 have only a little thickness, whereas the intermediate wall parts 7b have a greater thickness of material. This further increased the above discussed lever effect which makes the ends 10 (see left part of FIG. 2) of the walls, that is the wall parts 7a, come into contact with the shaft 6 before the relatively thicker wall parts 7b are pressed into contact with the shaft when the pressure chamber 5 is pressurized. The differences in thickness between the wall parts 7a and 7b can be varied depending on the circumstances, and the thicknesses can be made successively or stepwise changed along the length of the bushing. It is also possible to vary the thickness both in more thick and in more thin direction following the length of the wall.

I claim:

1. A hydraulic clamp bushing which is connectable to a rotary shaft for transmitting axial or rotary torques, said clamp bushing comprising:

a closed circular sleeve having two sleeve walls and two bushing ends, at least one of said sleeve walls being formed as an expandable sleeve wall so as to expand radially outwards or inwards;

a pressure medium chamber between said two sleeve walls having a hydraulic pressure medium trapped therein;

a pressurizing means for pressurizing said hydraulic pressure medium to cause said expandable sleeve wall to expand radially outwards or inwards when said pressurizing medium is pressurized whereby the clamp bushing is adapted to be clamped to the rotary shaft;

wherein said two bushing ends of said closed sleeve are shaped with a respective inwardly directed fold prior to pressurizing of said pressure medium, and said inward folds of said bushing ends are then straightened when said pressure medium is pressurized; and wherein said expandable sleeve wall has respective end parts at and adjacent respective said bushing ends and intermediate parts between said end parts, said end parts having a thickness of material which is less than a thickness of material of said intermediate parts whereby respective axial end edges at an intersection of said expandable sleeve and said respective bushing ends are adapted to be initially pressed against the rotary shaft as said pressure medium is first pressurized by said pressurizing means in order to straighten up the clamp bushing relative to the rotary shaft before said intermediate wall parts are pressed to the rotary shaft by said pressure medium.

2. A clamp bushing as claimed in claim 1, wherein the bushing ends are folded angularly inwards into a sigma (Σ) shape having straight legs.

3. A clamp bushing as claimed in claim 2, wherein the bushing ends are angularly formed to such extent that the straight legs thereof provide an angle to each other of 70°–110°.

4. A clamp bushing as claimed in claim 3 wherein the angle of said straight legs is about 90°.

5. A clamp bushing as claimed in claim 1, wherein a length of contact of the expandable sleeve wall between said bushing ends is substantially the same as a total length of the clamp bushing, whereby the clamp bushing is adapted with the entire length thereof to engage the rotary shaft when said pressure medium is fully pressurized.

6. A clamp bushing as claimed in claim 1, wherein the expandable sleeve wall is formed with successively changed thickness of material along a length of the expandable sleeve wall.

7. A clamp bushing as claimed in claim 1, wherein the expandable sleeve wall is formed with stepwise changed thickness of material along a length of the expandable sleeve wall.

* * * * *